United States Patent
Krishnan et al.

(10) Patent No.: US 6,444,022 B1
(45) Date of Patent: Sep. 3, 2002

(54) WATER BASED OFFSET LITHOGRAPHIC PRINTING INK

(75) Inventors: Ramasamy Krishnan, Colonia; Martin Thomas Czebotar, Somerset; Hugo Babij, Waldwick, all of NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/576,079

(22) Filed: May 20, 2000

(51) Int. Cl.$^7$ ................................................ C09D 11/02
(52) U.S. Cl. .................. 106/31.73; 106/31.69; 106/31.75; 106/31.86; 106/31.78
(58) Field of Search .................... 106/31.73, 31.69, 106/31.86, 31.75, 31.78

(56) References Cited

U.S. PATENT DOCUMENTS

| | | | |
|---|---|---|---|
| 3,356,030 A | 12/1967 | Greubel | 101/452 |
| 3,877,372 A | 4/1975 | Leeds | 101/465 |
| 4,079,026 A | 3/1978 | Mone | 106/31.41 |
| 4,104,219 A | 8/1978 | Peters et al. | 260/29.6 RB |
| 4,173,554 A | 11/1979 | Sulzberg | 260/29.2 EP |
| 4,278,467 A | 7/1981 | Fadner | 106/2 |
| 4,419,132 A | 12/1983 | Moynihan | 106/31.67 |
| 4,543,102 A | 9/1985 | Defago et al. | 8/471 |
| 4,854,969 A | 8/1989 | Bassemir et al. | 106/2 |
| 4,954,556 A | 9/1990 | Bull et al. | 524/378 |
| 5,039,339 A | 8/1991 | Phan et al. | 428/481 |
| 5,098,478 A | 3/1992 | Krishnan et al. | 106/31.86 |
| 5,167,704 A | 12/1992 | Brower | 106/31.6 |
| 5,174,815 A | 12/1992 | Kondo et al. | 106/31.6 |
| 5,370,906 A | 12/1994 | Dankert | 427/261 |
| 5,389,130 A | 2/1995 | Batlaw et al. | 106/31.26 |
| 5,417,749 A | 5/1995 | Krishnan et al. | 106/31.26 |
| 5,429,841 A | 7/1995 | Batlaw et al. | 106/31.26 |
| 5,573,578 A | 11/1996 | Okuda | 106/31.26 |
| 5,725,646 A | 3/1998 | Krishnan et al. | 106/31.73 |
| 6,019,829 A | * 2/2000 | Omae et al. | 106/31.65 |
| 6,200,372 B1 | * 3/2001 | Krishnan et al. | 106/31.73 |

FOREIGN PATENT DOCUMENTS

| | | | | |
|---|---|---|---|---|
| DE | 41 19 348 A1 | 12/1992 | | B41F/7/02 |
| WO | WO 97/33750 | 9/1997 | | B41F/13/22 |
| WO | WO 97/33757 | 9/1997 | | B41M/1/08 |

OTHER PUBLICATIONS

R.H. Leach and R.J. Pierce, "The Printing Ink Manual," Fifth Edition (1993), pp. 571–576, No month available.

* cited by examiner

*Primary Examiner*—Helene Klemanski
*Assistant Examiner*—Veronica F. Faison
(74) *Attorney, Agent, or Firm*—Sidney Persley

(57) ABSTRACT

A water based offset lithographic ink comprising water; a modified rosin polymer comprised of resins soluble in water regardless of the pH of the water, resin rosin salts soluble in water at pH ranging from 7.5 to 10 and aqueous emulsion resins; a modified linseed oil; and pigment.

22 Claims, No Drawings

WATER BASED OFFSET LITHOGRAPHIC PRINTING INK

FIELD OF THE INVENTION

The invention relates to water based offset lithographic printing ink.

DESCRIPTION OF RELATED ART

In an attempt to eliminate volatile organic compounds (VOCs) in the pressroom, water-based alternatives are being sought for ink formulations. Water-based printing inks for use in flexographic printing processes are known in the prior art. This type of printing process utilizes printing plates wherein the printing images stand up in relief, i.e. the areas to be printed are raised above the non-printing areas. Printing by the flexographic process requires relatively low pressure while sufficient pressure is applied to transfer the ink from the face of the image carrier to the surface of the substrate. Examples of useful water-based flexographic printing inks are disclosed in U.S. Pat. No. 4,173,554, U.S. Pat. No. 5,725,646 and *The Printing Ink Manual*, edited by R. H. Leach and R. J. Pierce, pages 571–576, 5th edition, (Blueprint, 1993).

Water-based inks for gravure printing are also well known. In the gravure process, the printing image is engraved into a cylinder in the form of cells which become filled with ink. Printing is achieved by passing the substrate between the gravure cylinder and impression roller under pressure. Examples of useful water-based gravure printing inks are disclosed in U.S. Pat. Nos. 4,954,556 and 5,098,478.

The offset lithographic printing process presents a unique challenge to ink formulators since such process utilizes a planographic printing plate, i.e. the image and non-image areas are in the same plane on the image carrier, and two fluids are concurrently utilized.

It is fairly simple to define an image area by raising it above the background as in the case of the flexographic printing plate or lowering it as in the case of the gravure printing plate; avoidance of ink adhering to the non-image area is not too difficult to achieve. However, when all areas are on the same level, techniques must be utilized to insure that ink adheres only to the image area, and not to the non-image area.

In conventional offset lithographic printing processes, the plate is damped before it is inked with an oil-based ink. Typically, the damping process utilizes a fountain solution such as those described in U.S. Pat. Nos. 3,877,372, 4,278,467 and 4,854,969. Water will form a film on the hydrophilic areas (i.e. the non-image areas) of the printing plate, but will contract into tiny droplets on the oleophilic areas (i.e. the image areas). When an inked roller containing the oil-based ink is passed over the damped plate, it will be unable to ink the areas covered by the water film (the non-image areas), but will emulsify the droplets on the water-repellant areas (the image areas) and these will ink up. Such process is called offset lithography because the inked image on the plate does not directly print onto the paper substrate, but is first "offset" onto a rubber blanket, and transferred therefrom onto the paper substrate.

As mentioned above, conventional offset lithographic printing processes entails the use of oil-based inks and water-based fountain solutions. The ink/water balance is critical and is quite demanding of the pressman's skills. This issue is one of the several disadvantages associated with such printing processes as compared to flexographic and gravure printing processes. Moreover, the oil-based inks and aqueous fountain solutions typically employed in conventional offset lithographic printing processes contain fairly high levels of undesirable volatile organic compounds ("VOCs").

U.S. Pat. No. 3,356,030 discloses the use of a water-based printing ink in respect to a method of planographic printing utilizing a lithographic printing plate whose non-image areas are coated with a cured coating of a thermosetting silicone resin. However, the patented method also entails the use of a volatile hydrocarbon fountain solution which will coat the non-image areas and which is re-applied between successive printings. Of course, the use of a volatile hydrocarbon fountain solution undermines the principal purpose of the water-based ink compositions of the present invention, i.e. the avoidance of the use of volatile organic compounds ("VOCs") during the printing process. Indeed, the water-based ink compositions of the present invention may be used for offset lithographic printing processes without any fountain solution whatsoever.

In the 1980s, a resurgence of interest occurred in respect to "waterless" lithographic printing processes. Both positive and negative waterless planographic printing plates are commercially available from Toray Industries of Japan. The image area of a waterless planographic plate is a photopolymer similar to that employed for the image area of a conventional plate. However, the non-image area is coated with a polymer such as a silicone which is ink repellant. Further information about waterless printing plates and processes may be found in U.S. Pat. Nos. 5,370,906 and 5,417,749.

The waterless printing process solved two issues: VOCs emanating from the fountain solutions and control of the ink/water balance by the pressman. However, the difference in surface energy between the image and non-image areas of the conventional offset lithographic printing plate is typically 40 dynes/cm is dramatically reduced to 20 dynes/cm in the case of the waterless printing plate. Therefore the latitude between scumming and poor print density is considerably narrowed and the issue of VOCs (emanating from the oil-based ink) still remains in respect to waterless printing.

German Offenlegungsschrift DE 41 19 348 A1 pertains to a moistureless offset printing method and a water-based printing ink. The ink described therein is one which will adhere to hydrophilic materials, but not to hydrophobic materials, and contains a dye, water, 5–50% water-soluble modified rosin polymer and a hygroscopic liquid, preferably a multihydric alcohol.

U.S. Pat. No. 5,725,646, which is incorporated herein by reference, describes a way of stabilizing a waterbased offset ink composition without drying up on a conventional multi roller ink train. Such composition eliminated the principal disadvantages of conventional offset lithographic printing inks, viz. high levels of VOCs emanating from the oil-based ink and the aqueous fountain solution and the difficulty in controlling the ink/water balance, while preserving the principal advantage of the conventional lithographic printing process, i.e. high surface energy differential between the image and non-image areas of the printing plate. It consists of using a rewetting agent, namely hydroxy ethyl ethylene urea. Since this rewetting agent does not dry, it remains in the final film making it susceptible to poor water resistance. Use of conventional rewetting agents, such as glycols and glycol ethers not only imparts poor water resistance to the final film, but also increases the tack of the formulations, thereby limiting its use on high speed presses.

Thus, there is a need in the art for a waterbased offset ink composition that is stable on conventional ink trains and exhibits good water resistance to the final film without increasing the tack of the formulation, thereby allowing for its use on high speed presses. A solution has been achieved by means of the present invention which comprises a water-based printing ink that is to be used in offset lithographic newspaper printing processes without the need for any accompanying fountain solutions.

GENERAL DESCRIPTION

Currently, all lithographic offset newspaper printing is done with inks which contain mineral oil or soy bean oils. These inks are also used in conjunction with a fountain solution which typically contains a desensitizer, a salt, and glycol. In order to prevent the evaporation of water from the printing rollers it was desirable to have constant humidity. This provided advantages over existing compositions, mainly zero VOC., water washability, and fast drying.

The prior art discloses a way of stabilizing a water based offset ink composition without drying up on a conventional multi roller ink trains. Such compositions consist of using a rewetting agent, namely hydroxyethyl ethylene urea. Since those rewetting agents do not dry, it remains in the final film, thereby making it susceptible to poor water resistance. Use of these conventional rewetting agents such as glycols and glycol ethers not only impart poor water resistance to the final film, but also increase the tack of the formulations, thereby limiting its use on high speed presses.

It has now been discovered that by reacting polyglycols, e.g., PEG 200, PEG 400, PEG 600, with linseed oil, the slow drying and poor water resistance problems associated with hydroxyethyl ethylene urea are overcome, while still maintaining water solubility of the compositions.

A water based offset lithographic news ink composition according to the present invention comprises: (a) water;(b) a modified rosin polymer comprised of: (i) resin soluble in water regardless of the pH of the water,(ii) resin rosin salts soluble in water at a pH ranging from about 7.5 to about 10, and (iii) aqueous emulsions resins; (c) a modified linseed oil; and (d) pigment.

DETAILED DESCRIPTION

The printing plates for use with the newspaper printing ink of the present invention should be such that the image areas thereof are hydrophilic in nature, while the non-image areas are hydrophobic in nature. An example of a suitable printing plate is the "waterless" Toray type discussed above. However, the image area of the plate need not contain a photopolymer. The image area of the plate may comprise, e.g. a grained aluminum surface which has no coating thereon, but is hydrophilic in nature. The non-image area of the plate must, of course, be hydrophobic in nature. However, the non-image area may be covered with any type of hydrophobic material, provided that such hydrophobic material adheres to the non-images area of the plate during the printing process.

The modified rosin polymer according to the present invention may be a maleic modified rosin esterified with pentaerithrytol. Examples of suitable modified rosin polymer which are soluble in the water phase of the ink regardless of the pH of the water phase include: carboxymethyl-cellulose, hydroxyethyl cellulose, hydroxypropyl-cellulose, hydroxybutylmethylcellulose, poly($C_1$–$C_4$)alkylene oxides, polyethyleneimine, polyvinyl alcohol, polyvinyl acetate, polyvinylpyrollidone, polyvinyl-oxazolidone and polyacrylamide polymers.

Preferably, the modified rosin polymer present in the ink are only those which are soluble in the water at pH ranging from about 7.5 to about 10. Suitable examples of such modified rosin polymers include methacrylic resins; styrene-acrylic resins; rosin salts; and polystyrene-sulfonic acid and their salts. Ammonia or an organic amine such as monoethanolamine or N,N-diethanolamine may be added to the water phase in order to adjust the pH to the preferred value (a mineral acid or an organic acid such as acetic acid may be used to adjust the pH to a value in the range of about 2.5 to about 6.5).

Suitable examples of the modified rosin polymers comprising aqueous emulsions include acrylic or vinyl emulsion polymers prepared from monomers selected from the group consisting of acrylic acid esters, methacrylic acid esters, acrylic acid esters of polyhydric alcohols, methyl methacrylate, styrene, vinyl styrene and vinyl acetate.

The offset lithographic ink formula of the present invention employs a modified linseed oil. The modified linseed oil according to the present invention comprises the reaction product of a polyglycol and linseed oil. The modified linseed oil according to the present invention may also include lithium ricinoleate, phthalic anhydride and triphenyl phosphite.

The pigment may be any of those which are suitable for formulating offset lithographic printing inks such as CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

In the water-based offset lithographic news ink of the present invention the water is present in amounts of 25 to 60 wt. %; and more preferably 35 to 50 wt. %. It is also preferred that the modified rosin polymers be present in amounts of 10 to 70 wt. %; and more preferably 30 to 60 wt. %; and most preferably the modified rosin polymers is a composite having up to 5 wt. % of a resin binder soluble in water regardless of the pH of the water; 10 to 70 wt. % of a resin binder soluble in water at a pH ranging from 7.5 to 10; and up to 20 wt. % of an aqueous emulsion resin binder. The modified linseed oil is present in amounts of 25 to 60 wt. %, and more preferably 35 to 55 wt. %. Finally, the pigment is preferably present in amounts of 2 to 30 wt. % and the soybean oil based modified resin is present in amounts of 15 to 35 wt %.

If desired, the usual adjuvants such as waxes, anti-foam agents, biocides, surfactants, corrosion inhibitors, etc. may be incorporated in the inks of the present invention. In another embodiment of the water-based offset lithographic printing ink of the present invention, a non-ionic surfactant is employed in the amount of up to 5 wt. %. Suitable examples of the surfactant include acetylenic glycols, ethoxylated glycols and sorbitan esters.

The water-based news ink of the present invention are further illustrated by the following non-limiting examples in which all parts and percentages are by weight, unless otherwise indicated.

EXAMPLE 1

Using PEG-200 the following modified linseed oil composition was formulated according to the procedure indicated herein below:

|   |   | wt | % |
|---|---|---|---|
| A. | Alkali Refined Linseed Oil (ARLO) | 598 | 55.68 |
| B. | PEG 100 and 02108EQ | 300 | 27.94 |
| C. | Lithium | 1 | .09 |
| D. | Phthalic Anhydride | 174 | 16.20 |
| E. | Triphenyl Phosphate #331905 | 1 | .09 |
|   | Total | 1074 | 100.00 |
|   | Xylene for reflux | ~45 |   |

The reactor was loaded with components A, B and C. This mixture was then heated to 230° C. The mixture was then held for alcoholysis with at least a 2:1 mixture of methanol. Components D and E were then added. A xylene reflux solution was added and the mixture was then heated to 265° C. The temperature was held at 265° C. for steady A. V. ≦10. After steady A.V., the solution was held under a vacuum for 15 minutes. The final solution was cooled and discharged for use in the water-based offset lithographic printing ink composition.

EXAMPLE 2

Using the modified linseed oil composition of Example 1, a paste ink was prepared. First a pigment base was made using the following compositions.

| Carbon Black | 40% |
|---|---|
| Rosin Ester Varnish | 20% |
| Modified Linseed Oil | 35% |
| Monoethanolamine | 3% |
| Surfynol 440 | 2% |
|   | 100% |

The modified linseed oil was incorporated into a water based offset ink composition as indicated. After passing the above composition on a 3-roll mill, paste ink was prepared in a high-speed mixer using the following formula.

| Black Base | 60% |
|---|---|
| Urethane Latex | 25% |
| Modified Linseed | 20% |
| Driers | 3% |
| Monoethanolamine | 2% |
|   | 100% |

The ink was printed on a Komori 42" press. A waterless Toray™ type "waterless" plate was employed. The Komori 42" press was equipped with a Patriot 3000 blanket. Imaging was on a PEARLsetter™ 74 plate and cleaned on a Javin Model #P32. The paper used was Monticello Gloss, 100#, 19"×25".

Stability was observed on an Inkometer at a speed of 1200 rpm with a tack of 20. The press room temperature was 69° F. and the relative humidity was 52%. The ink was completely stable on an Inkometer at a speed of 1200 RPM with a tack of 20. The printing speed was 8,000 IPH.

The ink flowed from the ink fountain onto the ink train without any need for fountain agitation. No dry ink residues were encountered on the rollers during the press clean-up. The ink did not dry on the sheets, even after 24 hours.

The present invention has been described in detail, including the preferred embodiments thereof. However, it will be appreciated that those skilled in the art, upon consideration of the present disclosure, may make modifications and/or improvements on the invention that fall within the scope and spirit of this invention as set forth in the following claims.

What is claimed is:

1. A water based offset lithographic printing ink comprising:
    (a) water;
    (b) a modified rosin polymer, in an amount of from about 10 wt. % to about 70 wt. %, based on a total weight of the ink, the modified rosin polymer including at least one compound selected from the group (i)–(iv) consisting of:
        (i) a resin soluble in water regardless of the pH of the water, in an amount of from 0 to about 5 wt. %, based on the total weight of the ink,
        (ii) a rosin resin salt soluble in water at a pH ranging from about 7.5 to about 10, in an amount of from about 10 wt. % to about 70 wt. %, based on the total weight of the ink,
        (iii) an aqueous emulsion forming resin, in an amount of from 0 wt. % to about 20 wt. %, based on the total weight of the ink, and
        (iv) combinations of at least two of (ii) and one or more of (i) and (iii);
    (c) a polyol modified linseed oil having increased water solubility; and
    (d) pigment.

2. The ink of claim 1, wherein the amount of water present is 35 to 50 wt. %.

3. The ink of claim 1, wherein the amount of modified rosin polymer present is 30 to 60 wt. %.

4. The ink of claim 1, wherein the resin soluble in the water regardless of the pH of the water is selected from the group consisting of: carboxymethylcellulose, hydroxyethyl cellulose, hydroxypropyl cellulose, hydroxybutylmethylcellulose, poly($C_1$–$C_4$)alkylene oxides, polyethyleneimine, polyvinyl alcohol, polyvinyl acetate, polyvinylpyrrolidone, polyvinyl oxazolidone and polyacrylamide.

5. The ink of claim 1, wherein the rosin resin salt soluble in the water at a pH ranging from about 7.5 to about 10 is selected from the group consisting of: methacrylic resins; styrene acrylic resins; polystyrene sulfonic acid resins; and corresponding salts thereof.

6. The ink of claim 1, wherein the aqueous emulsion forming resin is selected from the group consisting of: acrylic polymers, and vinyl polymers.

7. The ink of claim 1, wherein the amount of modified linseed oil present is 25 to 60 wt %.

8. The ink of claim 1, wherein the amount of pigment present is 10 to 20 wt. %.

9. The ink of claim 1, wherein the pigment is selected from the group consisting of CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

10. The ink of claim 1, further comprising a non-ionic surfactant.

11. The ink of claim 10, wherein the non-ionic surfactant is present in an amount of up to 5 wt. %.

12. The ink of claim 10, wherein the nonionic surfactant is selected from the group consisting of acetylenic glycols, ethoxylated glycols and sorbitan esters.

13. The ink of claim 6, wherein the acrylic polymers are prepared from acrylic monomers selected from the group consisting of: acrylic acid esters, methacrylic acid esters, and methyl methacrylate.

14. The ink of claim 6, wherein the vinyl polymers are prepared from vinyl monomers selected from the group consisting of: styrene, vinylstyrene, and vinyl acetate.

15. The ink of claim 13, wherein the acrylic acid esters are acrylic acid esters of polyhydric alcohols.

16. The ink of claim 1, wherein the linseed oil is modified by reacting it with a polyglycol.

17. The ink of claim 16, wherein the polyglycol is polyethylene glycol (PEG).

18. The ink of claim 17, wherein the PEG has an average molecular weight of from 200 (PEG 200) to 600 (PEG 600).

19. A water based offset lithographic printing ink comprising:
   a. water, in an amount of from about 25 wt. % to about 60 wt. %, based on a total weight of the ink;
   b. a modified rosin polymer, in an amount of from about 10 wt. % to about 70 wt. %, based on the total weight of the ink, the modified rosin polymer including at least one compound selected from the group (i)–(iv) consisting of:
      (i) a resin soluble in water regardless of the pH of the water, in an amount of from 0 to about 5 wt. %, based on the total weight of the ink,
      (ii) a rosin resin salt soluble in water at a pH ranging from about 7.5 to about 10, in an amount of from about 10 wt. % to about 70 wt. %, based on the total weight of the ink,
      (iii) an aqueous emulsion-forming resin, in an amount of from 0 wt. % to about 20 wt. %, based on the total weight of the ink, and
      (iv) combinations of at least two of (ii) and one or more of (i) and (iii);
   (c) a linseed oil that has been modified to have increased water solubility, in an amount of from about 25 wt. % to about 60 wt. %, based on the total weight of the ink; and
   (d) pigment, in an amount of from about 2 wt. % to about 30 wt. %, based on the total weight of the ink.

20. The ink of claim 19 wherein:
   (a) the water is present in an amount of from about 35 wt. % to about 50 wt. %;
   (b) the modified rosin polymer is present in an amount of from about 30 wt. % to about 60 wt. %;
   (c) the modified linseed oil is present in an amount of from about 35 wt. % to about 55 wt. %; and
   (d) the pigment is present in an amount of from about 2 wt. % to about 30 wt. %.

21. The ink of claim 19, further comprising a non-ionic surfactant, in an amount of from 0 to about 5 wt. % of the total weight of the ink.

22. A water based offset lithographic printing ink comprising:
   (a) water, in an amount of from about 25 wt. % to about 60 wt. %, based on a total weight of the ink;
   (b) a modified rosin polymer, in an amount of from about 10 wt. % to about 70 wt. %, based on the total weight of the ink, the modified rosin polymer including at least one compound selected from the group (i)–(iv) consisting of:
      (i) a resin soluble in water regardless of the pH of the water, selected from the group consisting of: carboxymethylcellulose, hydroxyethyl cellulose, hydroxypropyl cellulose, hydroxybutylmethylcellulose, poly($C_1$–$C_4$)alkylene oxides, polyethyleneimine, polyvinyl alcohol, polyvinyl acetate, polyvinylpyrrolidone, polyvinyl oxazolidone and polyacrylamide, in an amount of from 0 to about 5 wt. %, based on the total weight of the ink,
      (ii) a rosin resin salt soluble in water at a pH ranging from about 7.5 to about 10, selected from the group consisting of: methacrylic resins; styrene acrylic resins; polystyrene sulfonic acid resins; and corresponding salts thereof, in an amount of from about 10 wt. % to about 70 wt. %, based on the total weight of the ink,
      (iii) an aqueous emulsion forming resin, selected from the group consisting of: acrylic polymers, prepared from acrylic monomers selected from the group consisting of: acrylic acid esters, methacrylic acid esters, and methyl methacrylate; and vinyl polymers, prepared from vinyl monomers selected from the group consisting of: styrene, vinylstyrene, and vinyl acetate, in an amount of from 0 wt. % to about 20 wt. %, based on the total weight of the ink, and
      (iv) combinations of at least two of (ii) and one or more of (i) and (iii);
   (c) a linseed oil that has been modified by reacting it with a polyethylene glycol having an average molecular weight of from 200 to 600, to have increased water solubility, in an amount of from about 25 wt. % to about 60 wt. %, based on the total weight of the ink; and
   (d) pigment, in an amount of from about 2 wt. % to about 30 wt. %, based on the total weight of the ink.

* * * * *